United States Patent
Miyazaki et al.

(10) Patent No.: US 9,864,216 B2
(45) Date of Patent: Jan. 9, 2018

(54) OPTICAL MODULATOR

(71) Applicant: Sumitomo Osaka Cement Co., Ltd, Tokyo (JP)

(72) Inventors: Norikazu Miyazaki, Tokyo (JP); Tokutaka Hara, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/604,951

(22) Filed: May 25, 2017

(65) Prior Publication Data

US 2017/0343837 A1 Nov. 30, 2017

(30) Foreign Application Priority Data

May 26, 2016 (JP) .................................. 2016-104774

(51) Int. Cl.
*G02F 1/225* (2006.01)
*G02F 1/035* (2006.01)
*G02F 1/21* (2006.01)

(52) U.S. Cl.
CPC .............. *G02F 1/035* (2013.01); *G02F 1/225* (2013.01); *G02F 2001/212* (2013.01); *G02F 2201/58* (2013.01)

(58) Field of Classification Search
CPC ........ G02F 1/035–1/0356; G02F 1/225; G02F 1/2255; G02F 1/2257; G02F 2201/58; G02F 2001/212
See application file for complete search history.

(56) References Cited

U.S. PATENT DOCUMENTS 6,332,055 B1 * 12/2001 Hatayama .......... G02B 6/12004
 385/140
7,444,039 B2 * 10/2008 Kondou .................. G02F 1/035
 385/2

(Continued)

FOREIGN PATENT DOCUMENTS

JP   2003233047 A1   8/2003
JP    201380009 A1   5/2013

(Continued)

OTHER PUBLICATIONS

Japan Patent Office, Office Action dated Sep. 26, 2017, Japan Patent Application No. 2016-104774, Tokyo, JP.

*Primary Examiner* — Jerry Rahll
(74) *Attorney, Agent, or Firm* — Taft Stettinius & Hollister LLP

(57) ABSTRACT

An optical modulator includes a substrate having an electro-optic effect, an optical waveguide formed on the substrate, a modulation part which modulates light waves propagating through the optical waveguide, and a light receiving element which detects the light waves propagating through the optical waveguide. As the modulation part, a first modulation part and a second modulation part, which respectively modulate light waves into which input light branches, are provided. As the light receiving element, a light receiving element for the first modulation part and a light receiving element for the second modulation part are provided. The light receiving elements are disposed such that their positions in a light propagation direction are shifted from each other by an amount corresponding to one light receiving element, or more.

4 Claims, 8 Drawing Sheets

(56) References Cited

U.S. PATENT DOCUMENTS

| | | | |
|---|---|---|---|
| 8,849,071 B2* | 9/2014 | Kissa | G02F 1/225 |
| | | | 385/3 |
| 8,923,658 B2* | 12/2014 | Ishikawa | G02B 6/12007 |
| | | | 385/1 |
| 9,377,665 B2* | 6/2016 | Sugiyama | G02F 1/225 |
| 9,568,801 B2* | 2/2017 | Sugiyama | G02F 1/011 |
| 9,571,203 B2* | 2/2017 | Sugiyama | G02F 1/2255 |
| 9,735,884 B2* | 8/2017 | Goebuchi | H04B 10/564 |
| 2003/0147591 A1 | 8/2003 | Doi et al. | |
| 2005/0111778 A1* | 5/2005 | Takahashi | G02F 1/225 |
| | | | 385/14 |
| 2005/0213863 A1* | 9/2005 | Sugiyama | G02F 1/2255 |
| | | | 385/2 |
| 2010/0202784 A1* | 8/2010 | Sugiyama | G02F 1/2255 |
| | | | 398/183 |
| 2010/0232737 A1* | 9/2010 | Sugiyama | G02B 6/12007 |
| | | | 385/2 |
| 2013/0306848 A1 | 11/2013 | Dell'Orto et al. | |
| 2015/0016771 A1 | 1/2015 | Maruyama et al. | |
| 2015/0378237 A1* | 12/2015 | Okamura | G02F 1/2255 |
| | | | 385/3 |
| 2017/0123287 A1 | 5/2017 | Hara et al. | |

FOREIGN PATENT DOCUMENTS

| | | |
|---|---|---|
| JP | 2014502377 A1 | 1/2014 |
| JP | 2015018193 A | 1/2015 |
| JP | 2015194517 A | 11/2015 |
| JP | 2015197451 A1 | 11/2015 |

* cited by examiner

OPTICAL MODULATOR

CROSS-REFERENCE TO RELATED APPLICATIONS

This application claims the benefit of Japanese Patent Application No. 2016-104774 filed May 26, 2016, the disclosure of which is herein incorporated by reference in its entirety.

BACKGROUND OF THE INVENTION

Field of the Invention

The present invention relates to an optical modulator and in particular, to an optical modulator having a plurality of light receiving elements to correspond to a plurality of modulation parts.

Description of Related Art

With the progress of high frequency and large capacity of an optical communication system, increases in the performance and integration density of an optical modulator which is used for the optical communication systems are being advanced.

Further, downsizing of a substrate for configuring an optical modulator is also being advanced according to a demand for downsizing of the optical modulator. However, the high performance, the high integration density, and the downsizing of the optical modulator are conflicting demands, and therefore, a devisal for achieving all of these demands is required.

With respect to such an optical modulator, the following inventions have been proposed.

For example, Japanese Laid-open Patent Publication No. 2015-18193 discloses an optical modulator having a structure in which light outputted from an optical waveguide and entering into a reflecting groove is reflected by a reflecting film on the bottom surface of the reflecting groove to head for upward, whereby light traveling in the optical waveguide is received by a light receiving element fixed to the surface of a substrate.

For example, Japanese Laid-open Patent Publication No. 2015-194517 discloses an optical modulator having a structure in which a light receiving element is disposed so as to overlay an output waveguide configuring a Mach-Zehnder waveguide and configured so as to receive two radiated lights which are radiated from a Y-junction of the Mach-Zehnder waveguide and two or more light receiving parts are formed to be spaced apart from each other on a single light receiving element substrate.

SUMMARY OF THE INVENTION

FIG. 1 is a plan view for describing an optical modulator according to Example 1 of the related art.

The optical modulator according to Example 1 of the related art has a first modulation part M(#1) and a second modulation part M(#2) which respectively modulate light waves into which input light branches. Each of the modulation parts M is configured by using an optical waveguide 2 formed on a substrate 1 having an electro-optic effect, and a control electrode 3 for controlling light waves propagating through the optical waveguide 2 by a control signal. The control electrode 3 is configured with an RF electrode 3a to which an RF signal (a modulation signal) which is a type of control signal is applied, DC electrodes 3b and 3c to which a DC signal (bias voltage) which is a type of control signal is applied, or the like.

The optical waveguide 2 configuring the modulation part M has a structure in which a sub-Mach-Zehnder waveguide is disposed in a nested type at an arm portion of a main Mach-Zehnder waveguide. The light waves (signal light) modulated in the modulation part M are guided to the outside of the substrate through an output waveguide 21 which is connected to a Y-junction of the main Mach-Zehnder waveguide in the modulation part M.

Radiated light waveguides 22 for propagating radiated light which is radiated from the Y-junction of the main Mach-Zehnder waveguide in the modulation part M are provided on both sides of the output waveguide 21 of each of the modulation parts M. Then, a light receiving element 4 is disposed so as to overlay the output waveguide 21 and the radiated light waveguides 22 on both sides of the output waveguide 21. In this example, as the light receiving elements 4, a light receiving element 4(#1) for the modulation part M(#1) and a light receiving element 4(#2) for the modulation part M(#2) are provided. Each of the light receiving elements 4 has a light receiving part 41 for receiving light waves from each of the radiated light waveguides 22 and is bonded and fixed to a predetermined position on the substrate 1 with an adhesive 42.

In the optical modulator according to Example 1 of the related art, the respective modulation parts M are disposed side by side in a width direction of the substrate 1 with the positions in a length direction (a light propagation direction) of the substrate 1 aligned with each other. Further, also with respect to the respective light receiving elements 4, similarly, they are disposed side by side in the width direction of the substrate 1 with the positions in the length direction of the substrate 1 aligned with each other. As the light receiving element 4, a light receiving element in which the length of one side is in a range of about 0.2 mm to 0.5 mm and the diameter of the light receiving part 41 is in a range of about 30 μm to 150 μm is used. In order to improve the workability of bonding work of the light receiving element 4 to the substrate 1 or the reliability of adhesion, it is necessary to increase the distance (D11) between the light receiving elements 4(#1) and 4(#2) adjacent to each other to some extent (in a range of about 0.1 mm to 0.2 mm). Accordingly, it is necessary to increase the distance (D12) between the optical waveguide 2 on the optical modulation area M(#1) side and the optical waveguide 2 on the optical modulation area M(#2) side, and this results in an increase of the length (a chip width W) in the width direction of the substrate 1.

FIG. 2 is a plan view for describing an optical modulator according to Example 2 of the related art.

The optical modulator according to Example 2 of the related art has a first modulation part M(#1) and a second modulation part M(#2), which respectively modulate light waves into which input light having a wavelength 1 branches, and a third modulation part M(#3) and a fourth modulation part M(#4), which respectively modulate light waves into which input light having a wavelength λ2 branches. Each of the modulation parts M is configured by using the optical waveguide 2 formed on the substrate 1 having an electro-optic effect, and the control electrode 3 (the RF electrode 3a, the DC electrodes 3b and 3c, or the like) for controlling light waves propagating through the optical waveguide 2 by a control signal.

The optical waveguide 2 configuring the modulation part M has a structure in which a sub-Mach-Zehnder waveguide is disposed in a nested type at an arm portion of a main Mach-Zehnder waveguide. The light waves (signal light) modulated in the modulation part M are guided to the outside of the substrate through the output waveguide 21 which is connected to the Y-junction of the main Mach-Zehnder waveguide in the modulation part M.

A monitoring waveguide 24 which extracts and propagates some of the light waves propagating through the output waveguide 21 for monitoring is provided on one side of the output waveguide 21 of each of the modulation parts M. Then, the light receiving element 4 is disposed so as to overlay the monitoring waveguide 24. In this example, as the light receiving elements 4, a light receiving element 4(#1) for the modulation part M(#1), a light receiving element 4(#2) for the modulation part M(#2), a light receiving element 4(#3) for the modulation part M(#3), and a light receiving element 4(#4) for the modulation part M(#4) are provided. Each of the light receiving elements 4 has the light receiving part 41 for receiving light waves from the monitoring waveguide 24 and is bonded and fixed to a predetermined position on the substrate 1 with the adhesive 42.

In the optical modulator according to Example 2 of the related art, the respective modulation parts M are disposed side by side in the width direction of the substrate 1 with the positions in the length direction (the light propagation direction) of the substrate 1 aligned with each other. Further, also with respect to the respective light receiving elements 4, similarly, they are disposed side by side in the width direction of the substrate 1 with the positions in the length direction of the substrate 1 aligned with each other. Looking at the modulation parts M (#1) and M (#2), since a sufficient distance can be provided between the light receiving elements 4 (#1) and 4 (#2), the optical waveguide 2 on the modulation part M(#1) side and the optical waveguide 2 on the modulation part M(#2) can be disposed close to each other. The same applies to the modulation parts M(#3) and M(#4). However, looking at the modulation parts M(#2) and M(#3), in order to secure a distance in a range of about 0.1 mm to 0.2 mm between the light receiving elements 4 (#2) and 4 (#3), it is necessary to increase the distance (D13) between the optical waveguide 2 on the modulation part M(#2) side and the optical waveguide 2 on the modulation part M(#3) side, and this results in an increase of the length (the chip width W) in the width direction of the substrate 1.

An object of the present invention is to solve the above problem and provide an optical modulator with a reduced chip width in an optical modulator having a light receiving element for each of a plurality of modulation parts.

In order to solve the above problem, an optical modulator according to the present invention has the following technical features.

(1) An optical modulator includes: a substrate having an electro-optic effect; an optical waveguide formed on the substrate; first and second modulation parts which respectively modulate light waves propagating through the optical waveguide; and a light receiving element which detects the light waves propagating through the optical waveguide, in which as the light receiving element, a first light receiving element for the first modulation part and a second light receiving element for the second modulation part are provided, and the first light receiving element and the second light receiving element are disposed to be shifted from each other in a light propagation direction.

(2) In the optical modulator according to the above (1), the first modulation part and the second modulation part are disposed to be shifted from each other in the light propagation direction, and the first light receiving element and the second light receiving element are disposed to be shifted from each other in the same light propagation direction as a direction in which the first modulation part and the second modulation part are shifted from each other.

(3) In the optical modulator according to the above (1) or (2), each of the first light receiving element and the second light receiving element has two or more light receiving parts.

(4) In the optical modulator according to the above (3), with respect to each of the first modulation part and the second modulation part, an output waveguide which guides the light waves modulated in the modulation part, and radiated light waveguides which guide radiated light from the modulation part to both sides of the output waveguide are provided, the respective radiated light waveguides on both sides of the output waveguide are bent so as to be parallel to each other, and the first light receiving element and the second light receiving element are respectively disposed at sections in which the radiated light waveguides on both sides of the output waveguide are parallelized, and are disposed to be shifted from each other in the light propagation direction.

According to the optical modulator according to the present invention, in an optical modulator provided with a substrate having an electro-optic effect, an optical waveguide formed on the substrate, first and second modulation parts which respectively modulate light waves propagating through the optical waveguide, and a light receiving element which detects the light waves propagating through the optical waveguide, as the light receiving element, a first light receiving element for the first modulation part and a second light receiving element for the second modulation part are provided, and the first light receiving element and the second light receiving element are disposed to be shifted from each other in a light propagation direction. Therefore, it is possible to provide an optical modulator with a reduced chip width.

DETAILED DESCRIPTION OF THE INVENTION

Hereinafter, an optical modulator according to the present invention will be described in detail.

Figure 1:
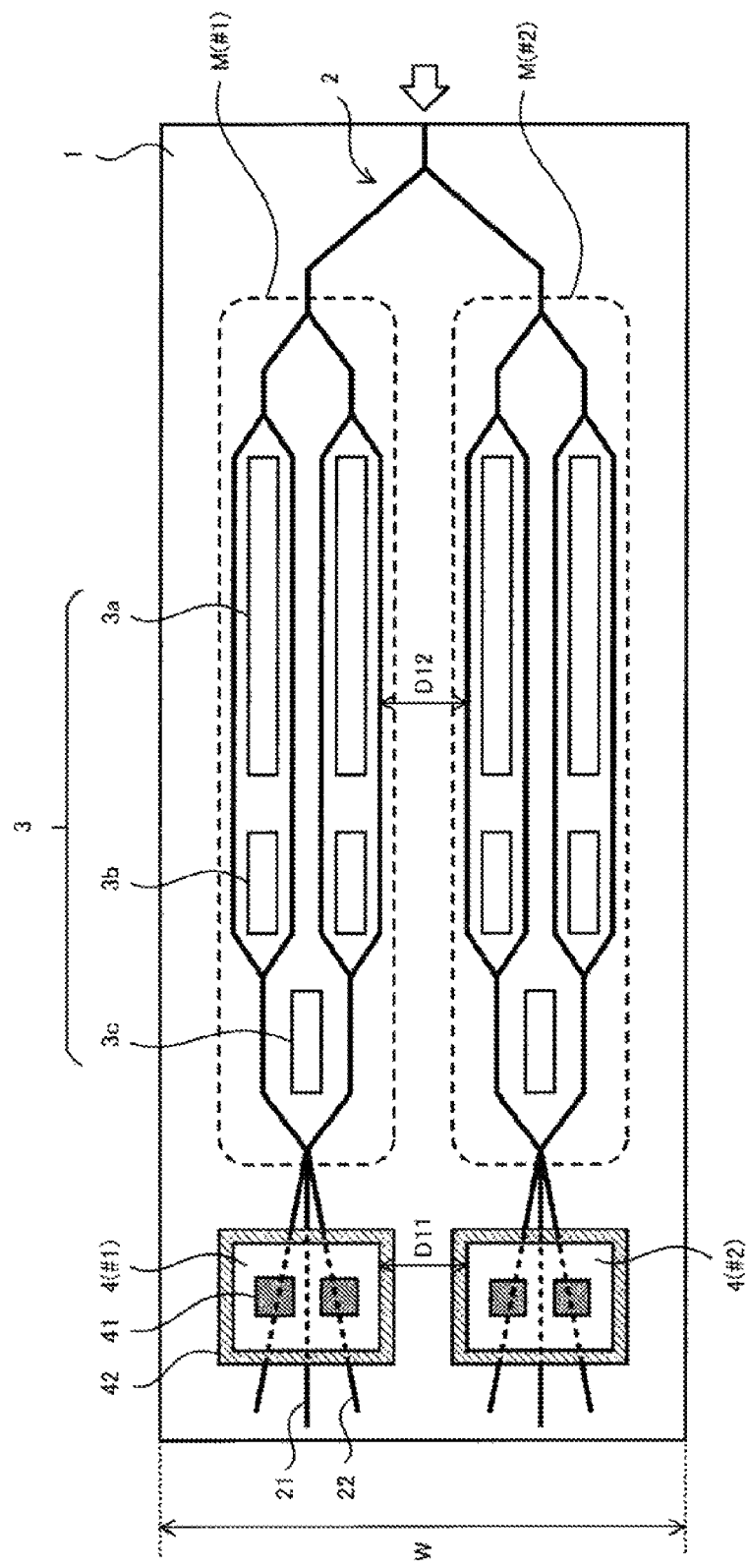
FIG. 1 is a plan view for describing an optical modulator according to Example 1 of the related art.
Figure 2:
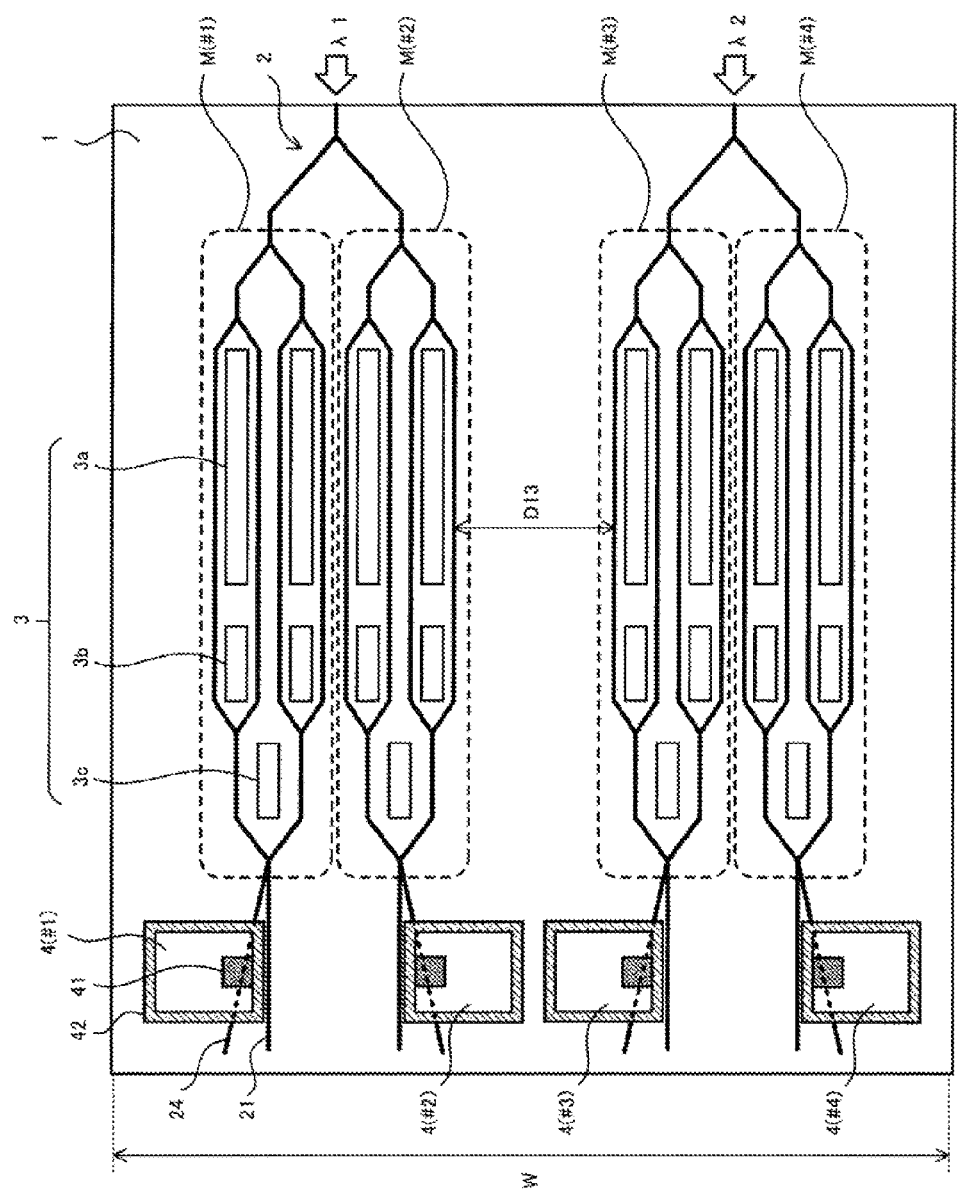
FIG. 2 is a plan view for describing an optical modulator according to Example 2 of the related art.
Figure 3:
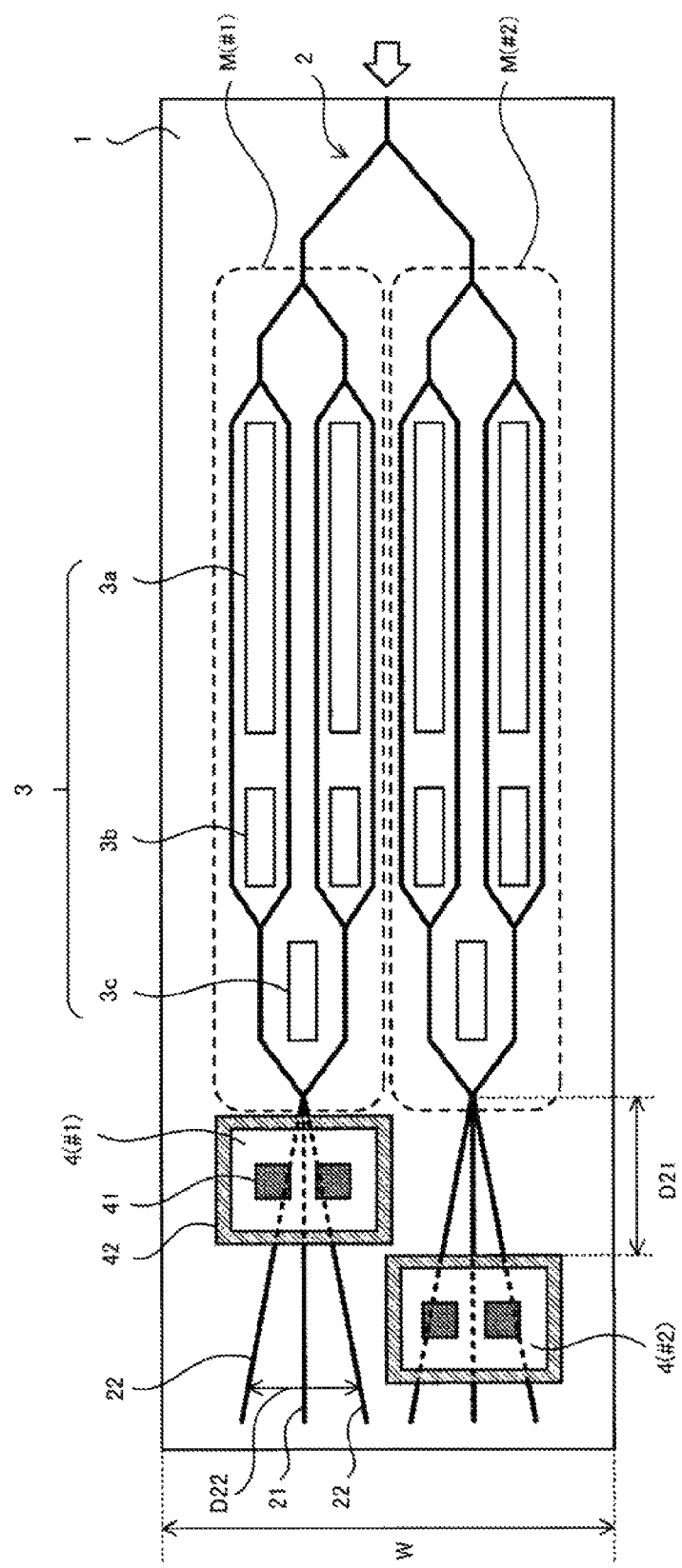
FIG. 3 is a plan view for describing an optical modulator according to a first example of the present invention.

The optical modulator according to the present invention includes, as a basic configuration, a substrate 1 having an electro-optic effect, an optical waveguide 2 formed on the substrate 1, a plurality of modulation parts M which respectively modulate light waves propagating through the optical waveguide 2, and a light receiving element 4 which detects the light waves propagating through the optical waveguide 2, as shown in FIG. 3, for example.

As the substrate 1, it is acceptable if it is a substrate such as quartz or a semiconductor, on which an optical waveguide can be formed, and in particular, a substrate using a single crystal such as $LiNbO_3$ (lithium niobate), $LiTaO_3$ (lithium tantalate), or PLZT (lead lanthanum zirconate titanate), which is a substrate having an electro-optic effect, can be suitably used.

The optical waveguide 2 which is formed on the substrate 1 is formed by thermally diffusing a high refractive index substance such as titanium (Ti) onto a $LiNbO_3$ substrate (an LN substrate), for example. Further, a rib type optical waveguide in which grooves are formed on both sides of a portion serving as an optical waveguide, or a ridge type waveguide in which an optical waveguide portion is made in a convex shape can also be used. Further, it is also possible to apply the present invention to an optical circuit in which optical waveguides are formed on different waveguide substrates such as PLC and these waveguide substrates are jointed and integrated.

A control electrode 3 for controlling light waves propagating through the optical waveguide 2 by a control signal is provided on the substrate 1. The control electrode 3 includes an RF electrode 3a configuring a modulation electrode, a ground electrode (not shown) surrounding the RF electrode 3a, DC electrodes 3b and 3c for applying a DC signal, or the like. These control electrodes 3 can be formed by forming an electrode pattern made of Ti.Au on the surface of the substrate and by a gold plating method or the like. Further, as necessary, it is also possible to provide a buffer layer such as dielectric $SiO_2$ on the surface of the substrate after the formation of the optical waveguide.

The optical waveguide 2 configuring the modulation part M has a structure in which a sub-Mach-Zehnder waveguide is disposed in a nested type at an arm portion of a main Mach-Zehnder waveguide. The light waves (signal light) modulated in the modulation part M are guided to the outside of the substrate through an output waveguide 21 which is connected to a Y-junction of the main Mach-Zehnder waveguide in the modulation part M.

The light receiving element 4 is disposed close to the output waveguide 21, and a radiated light waveguide 22 for leading radiated light, which is radiated from the Y-junction, to the light receiving element 4, or a monitoring waveguide 24 for leading some of the light waves of the output waveguide 21 to the light receiving element 4 is provided. The radiated light waveguide 22 guides the radiated light which is not guided to the output waveguide 21, to the light receiving element 4 as a monitoring signal. To this end, the radiated light can be led to the radiated light waveguide 22 by a coupler structure such as an MMI (multimode interference type) coupler, an asymmetric three-branch structure, or providing a radiated light guide in the vicinity of a Y-branch structure. The monitoring waveguide 24 distributes some of the light waves of the output waveguide 21 as a monitoring signal by a TAP coupler, thereby guiding it to the light receiving element 4.

Example 1

FIG. 3 is a plan view for describing an optical modulator according to a first example of the present invention.

The optical modulator of this example has a first modulation part M(#1) and a second modulation part M(#2) which respectively modulate light waves into which input light branches.

The radiated light waveguides 22 propagating the radiated light which is radiated from the Y-junction of the main Mach-Zehnder waveguide in the modulation part M are provided on both sides of the output waveguide 21 of each of the modulation parts M. Then, the light receiving element 4 is disposed so as to overlay the output waveguide 21 and the radiated light waveguides 22 on both sides of the output waveguide 21. In this example, as the light receiving elements 4, a light receiving element 4(#1) for the modulation part M(#1) and a light receiving element 4(#2) for the modulation part M(#2) are provided. Each of the light receiving elements 4 has two light receiving parts 41 for receiving light waves from the respective radiated light waveguides 22 and is bonded and fixed to a predetermined position on the substrate 1 with an adhesive 42. The monitoring signals received by the two light receiving parts 41 are electrically combined in the light receiving element or outside the light receiving element. In this way, it is possible to improve the bias point shift between the modulation curves of an output signal and a monitoring signal and further increase the signal intensity of the monitoring signal.

The modulation part M(#1) and the modulation part M(#2) are disposed side by side in a width direction of the substrate 1 with the positions in a length direction (a light propagation direction) of the substrate 1 aligned with each other. Further, the light receiving element 4(#1) and the light receiving element 4(#2) are disposed such that their positions in the light propagation direction are shifted from each other by an amount corresponding to one light receiving element, or more. Therefore, even if the distance between the optical waveguide 2 on the modulation part M(#1) side and the optical waveguide 2 on the modulation part M(#2) side is narrowed, the light receiving element 4(#1) and the light receiving element 4(#2) do not overlap each other.

In this manner, due to disposing the respective light receiving elements 4 so as to be shifted from each other by an amount corresponding to one light receiving element, or more, in the length direction of the substrate 1, the optical waveguide 2 on the modulation part M(#1) side and the optical waveguide 2 on the modulation part M(#2) side can be disposed close to each other, and thus the length (a chip width W) in the width direction of the substrate 1 can be shortened.

Example 2

Figure 4:
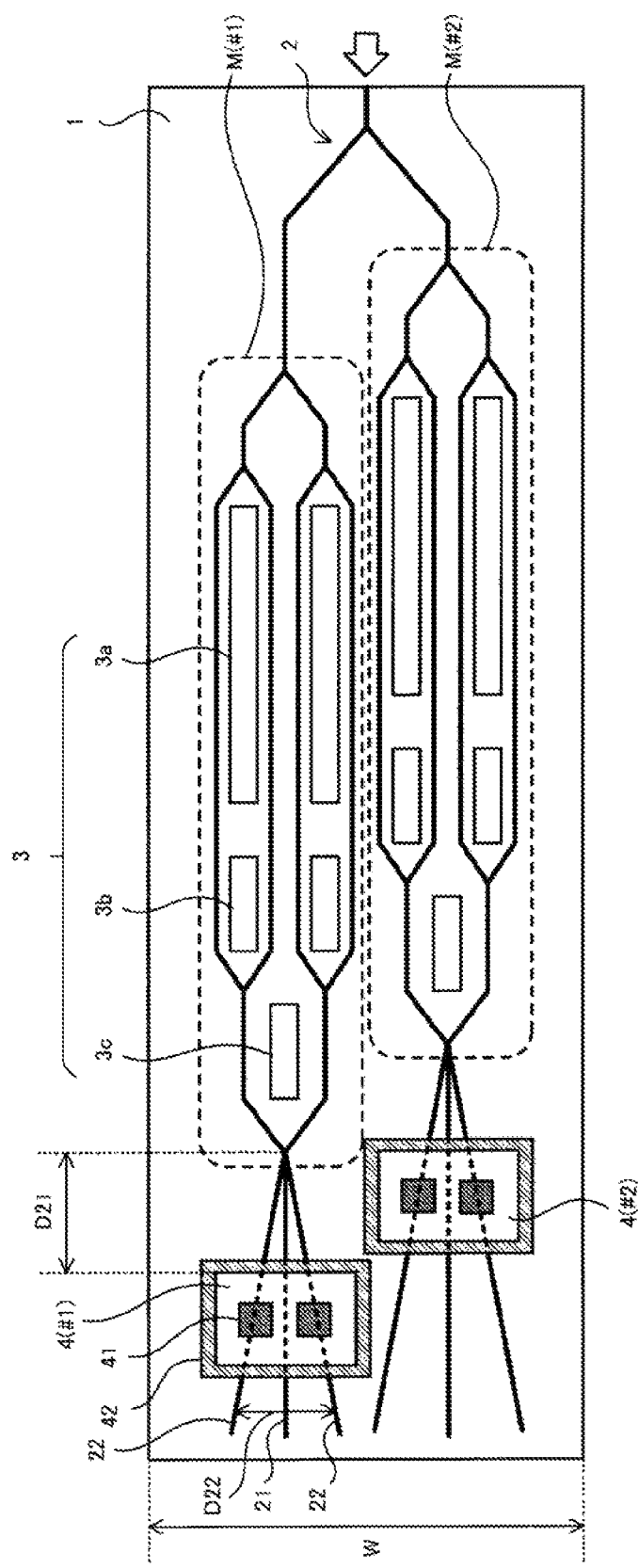
FIG. 4 is a plan view for describing an optical modulator according to a second example of the present invention.

FIG. 4 is a plan view for describing an optical modulator according to a second example of the present invention.

The optical modulator according to the second example is a modification example of the optical modulator according to the first example. In the optical modulator according to the first example, a distance D21 from a starting end portion of the radiated light waveguide 22 (the Y-junction of the Mach-Zehnder waveguide) to the light receiving element 4 is different between the light receiving element 4(#1) and the light receiving element 4(#2). In general, the distance D22 between the radiated light waveguides 22 increases with distance from the starting end portion, and therefore, the distance D22 between the radiated light waveguides 22 at the disposition position of the light receiving element 4(#1) and the distance D22 between the radiated light waveguides 22 at the disposition position of the light receiving element 4(#2) become different from each other. For this reason, in the optical modulator according to the first example, there is a concern that a difference may occur in a light receiving characteristic between the light receiving elements 4.

Therefore, in the optical modulator according to the second example, the modulation part M(#1) and the modulation part M(#2) are disposed to be shifted from each other in the light propagation direction, and the light receiving element 4(#1) and the light receiving element 4(#2) are disposed to be shifted from each other in the same light propagation direction as the direction in which the modulation part M(#1) and the modulation part M(#2) are shifted from each other. In this example, the modulation part M(#1) and the light receiving element 4(#1) are disposed to be shifted by an amount corresponding to one light receiving element, or more, further toward the downstream side in the light propagation direction than the modulation part M(#2) and the light receiving element 4(#2). Further, the shift amount and direction between the modulation part M(#1) and the modulation part M(#2) coincide with the shift amount and direction between the light receiving element 4(#1) and the light receiving element 4 (#2). Therefore, the distance D21 from the starting end portion of the radiated light waveguide 22 (the Y-junction of the Mach-Zehnder waveguide) to the light receiving element 4 is the same at the light receiving element 4(#1) and the light receiving element 4(#2).

In this way, the distance D22 between the radiated light waveguides 22 at the disposition position of the light receiving element 4(#1) and the distance D22 between the radiated light waveguides 22 at the disposition position of the light receiving element 4(#2) coincide with each other, and therefore, it is possible to uniformize the light receiving characteristic between the light receiving elements 4. Further, the waveguide structure from the Y-junction to the light receiving element 4 can be made to be the same between the light receiving elements 4, and therefore, the light receiving characteristic is further uniformized.

Further, the light receiving element 4(#1) and the light receiving element 4(#2) are disposed to be shifted from each other by an amount corresponding to one light receiving element, or more, and therefore, the optical waveguide 2 on the modulation part M(#1) side and the optical waveguide 2 on the modulation part M(#2) side can be disposed close to each other. Therefore, the length (the chip width W) in the width direction of the substrate 1 can be shortened.

Example 3

Figure 5:
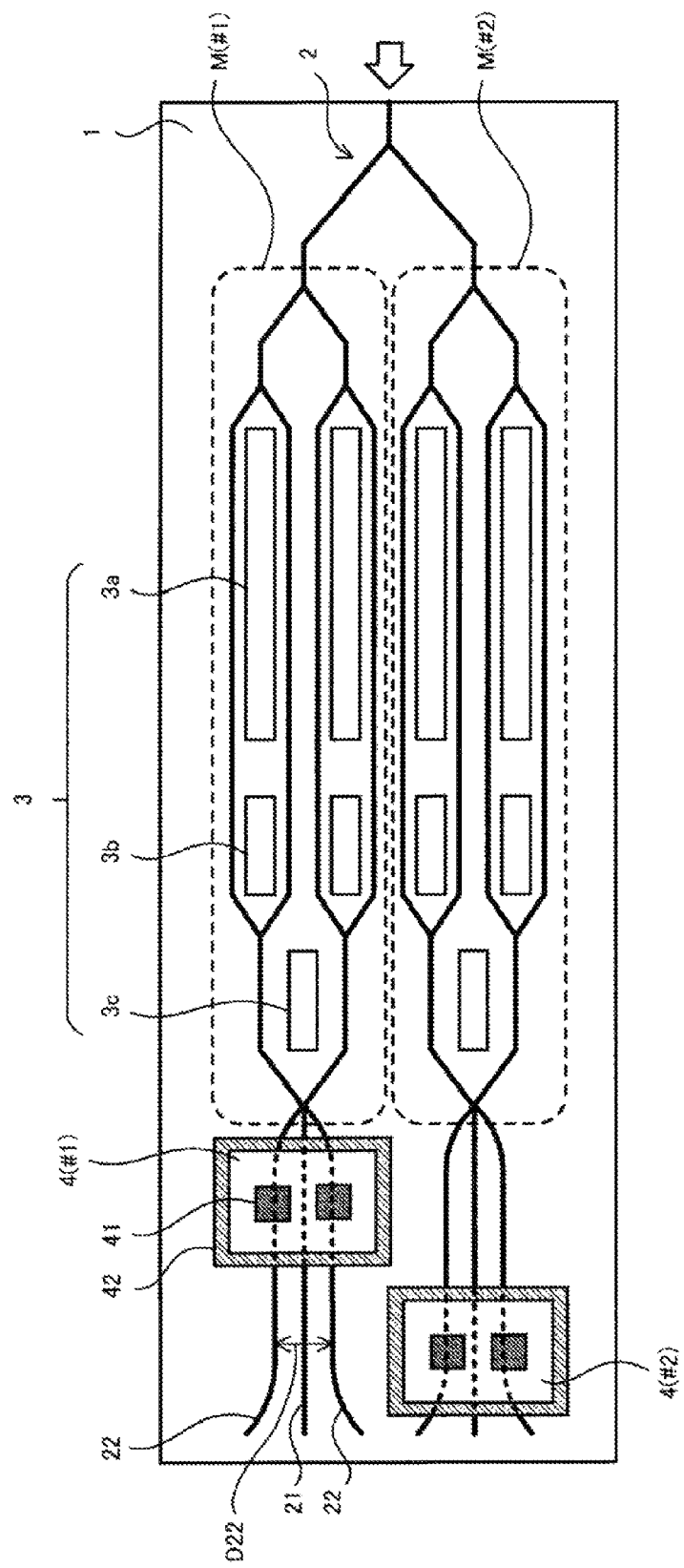
FIG. 5 is a plan view for describing an optical modulator according to a third example of the present invention.

FIG. 5 is a plan view for describing an optical modulator according to a third example of the present invention.

The optical modulator according to the third example is another modification example of the optical modulator according to the first example.

The modulation part M(#1) and the modulation part M(#2) are disposed side by side in the width direction of the substrate 1 with the positions in the length direction (the light propagation direction) of the substrate 1 aligned with each other. Further, the light receiving element 4(#1) is disposed to be shifted by an amount corresponding to one light receiving element, or more, further toward the downstream side in the light propagation direction than the light receiving element 4(#2). The respective radiated light waveguides 22 on both sides of the output waveguide 21 are bent so as to be parallel to each other, and the light receiving element 4 is disposed at the parallelized section.

In this way, the distance D22 between the radiated light waveguides 22 at the disposition position of the light receiving element 4(#1) and the distance D22 between the radiated light waveguides 22 at the disposition position of the light receiving element 4(#2) coincide with each other, and therefore, it is possible to uniformize the light receiving characteristic between the light receiving elements 4. Further, the light receiving element 4(#1) and the light receiving element 4(#2) are disposed to be shifted from each other by an amount corresponding to one light receiving element, or more, and therefore, the optical waveguide 2 on the modulation part M(#1) side and the optical waveguide 2 on the modulation part M(#2) side can be disposed close to each other. Therefore, the length (the chip width W) in the width direction of the substrate 1 can be shortened.

At the light wave output-side end portion of the substrate 1, It is desirable to bend the radiated light waveguide 22 in a direction in which the distance between itself and the output waveguide 21 increases such that the optical axes of the signal light which is output from the output waveguide 21 and the radiated light which is output from the radiated light waveguide 22 do not overlap each other. In this way, interference between the signal light (On light) and the radiated light (Off light) can be suppressed.

Example 4

Figure 6:
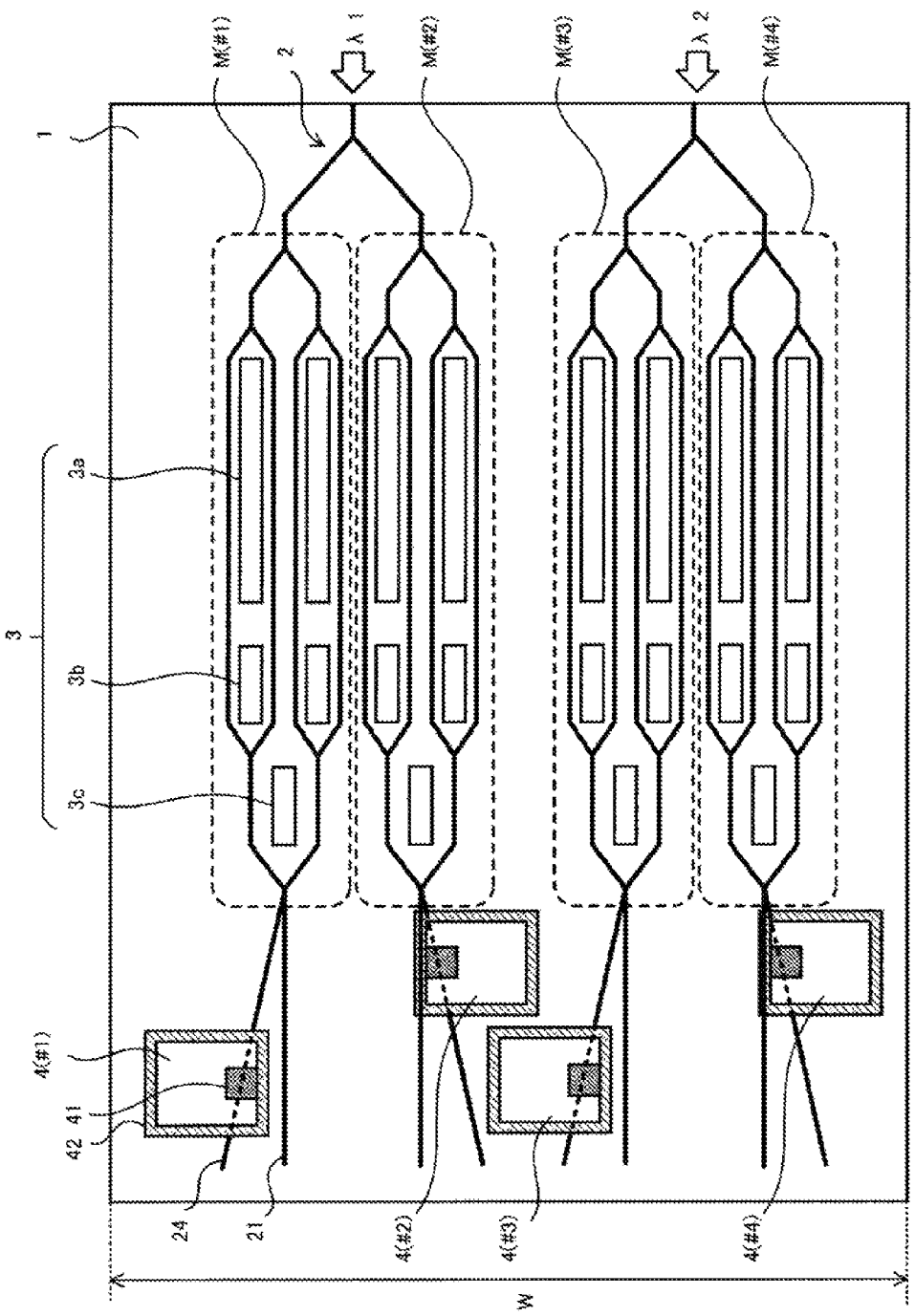
FIG. 6 is a plan view for describing an optical modulator according to a fourth example of the present invention.

FIG. 6 is a plan view for describing an optical modulator according to a fourth example of the present invention.

The optical modulator of this example has a first modulation part M(#1) and a second modulation part M(#2), which respectively modulate light waves into which input light having a wavelength λ1 branches, and a third modulation part M(#3) and a fourth modulation part M(#4), which respectively modulate light waves into which input light having a wavelength λ2 branches. The modulation parts M(#1) and M(#2) and the modulation parts M(#3) and M(#4) do not need to be necessarily formed on the same substrate 1 and may be respectively formed on different substrates.

The monitoring waveguide 24 which extracts and propagates some of the light waves propagating through the output waveguide 21 for monitoring is provided on one side of the output waveguide 21 of each of the modulation parts M. Then, the light receiving element 4 is disposed so as to overlay the monitoring waveguide 24. In this example, as the light receiving elements 4, the light receiving element 4(#1) for the modulation part M(#1), the light receiving element 4(#2) for the modulation part M(#2), a light receiving element 4(#3) for the modulation part M(#3), and a light receiving element 4(#4) for the modulation part M(#4) are provided. Each of the light receiving elements 4 has a single light receiving part 41 for receiving light waves from the monitoring waveguide 24 and is bonded and fixed to a predetermined position on the substrate 1 with the adhesive 42.

The modulation parts M(#1) to M(#4) are disposed side by side in the width direction of the substrate 1 with the positions in the length direction (the light propagation direction) of the substrate 1 aligned with each other. Further, the light receiving element 4(#1) and the light receiving element 4(#3) are disposed to be shifted by an amount corresponding to one light receiving element, or more, further toward the downstream side in the light propagation direction than the light receiving element 4(#2) and the light receiving element 4(#4). Therefore, even if the distance between the optical waveguide 2 on the modulation part M(#2) side and the optical waveguide 2 on the modulation part M(#3) side is narrowed, the light receiving element 4(#2) and the light receiving element 4(#3) do not overlap each other.

In this way, it is possible to narrow not only the space between the modulation parts M (#1) and M (#2) and the space between the modulation parts M(#3) and M(#4) but also the space between the modulation parts M(#2) and M(#3), and therefore, the length (the chip width W) in the width direction of the substrate 1 can be shortened.

Example 5

Figure 7:
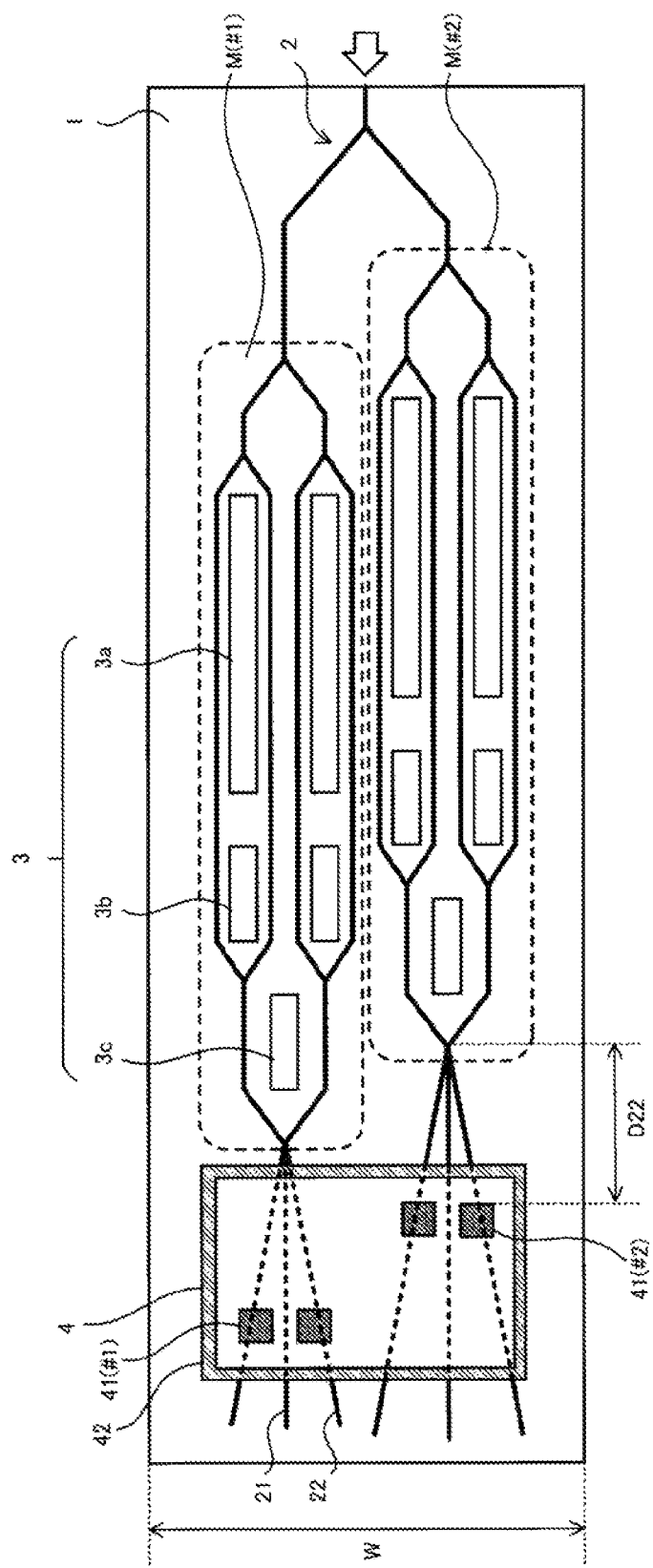
FIG. 7 is a plan view for describing an optical modulator according to a fifth example of the present invention.

FIG. 7 is a plan view for describing an optical modulator according to a fifth example of the present invention.

The optical modulator of this example has the first modulation part M (#1) and the second modulation part M (#2), which respectively modulate light waves into which input light branches.

The radiated light waveguides 22 propagating the radiated light which is radiated from the Y-junction of the main Mach-Zehnder waveguide in the modulation part M are provided on both sides of the output waveguide 21 of each of the modulation parts M. Then, a single light receiving element 4 is disposed so as to overlay the output waveguide 21 of each modulation part M and the radiated light waveguides 22 on both sides of the output waveguide 21. That is, in this example, the single light receiving element 4 is shared by the modulation parts M(#1) and M(#2). The light receiving element 4 has four light receiving parts 41 for receiving light waves from the respective radiated light waveguides 22 and is bonded and fixed to a predetermined position on the substrate 1 with the adhesive 42.

The modulation part M(#1) and the modulation part M(#2) are disposed to be shifted from each other in the light propagation direction. Then, in the light receiving element 4 which is shared by the modulation part M(#1) and the modulation part M(#2), the light receiving part 41 for the modulation part M(#1) and the light receiving part 41 for the modulation part M(#2) are disposed to be shifted from each other in the same light propagation direction as the direction in which the modulation part M(#1) and the modulation part M(#2) are shifted from each other. In this example, the shift amount and direction between the modulation part M(#1) and the modulation part M(#2) coincide with the shift amount and direction between the light receiving part 41 for the modulation part M(#1) and the light receiving part 41 for the modulation part M(#2). Therefore, a distance D22 from the starting end portion of the radiated light waveguide 22 (the Y-junction of the Mach-Zehnder waveguide) to the light receiving part 41 is the same at the light receiving element 4(#1) and the light receiving element 4(#2).

In this manner, the single light receiving element 4 is shared by the modulation part M (#1) and the modulation part M (#2), whereby the number of components on the substrate 1 can be reduced. Further, the optical waveguide 2 on the modulation part M(#1) side and the optical waveguide 2 on the modulation part M(#2) side can be disposed close to each other, and therefore, the length (the chip width W) in the width direction of the substrate 1 can be shortened. Furthermore, the disposition of the respective light receiving parts 41 in the light receiving element 4 is matched with the manner in which the modulation parts M(#1) and M(#2) are shifted from each other, and therefore, it is also possible to uniformize the light receiving characteristic between the light receiving parts 41.

Figure 8:
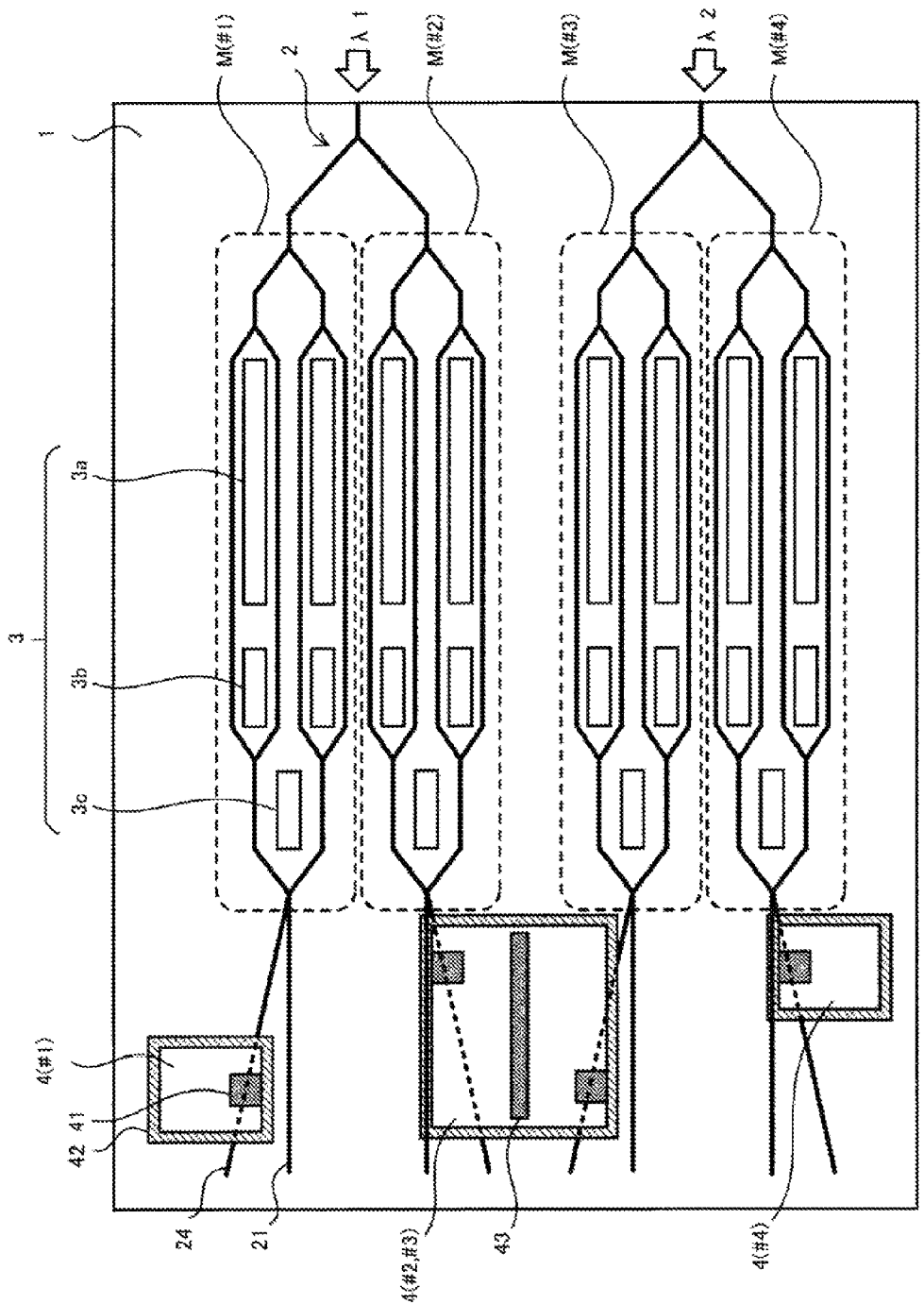
FIG. 8 is a plan view for describing an optical modulator in which the fourth example and the fifth example are combined.

The configuration of the fifth example can be used in combination with the configuration of the other example. For example, as shown in FIG. 8 showing an optical modulator combined with the configuration of the fourth example, a single light receiving element 4 may be shared by the modulation parts which modulate light waves having different wavelengths. In FIG. 8, the light receiving element 4(#2, #3) which is shared by the modulation part M(#2) for a light wave having a wavelength of λ1 and the modulation part M(#3) for a light wave having a wavelength of λ2 is provided. In this shared light receiving element 4(#2, #3), it is desirable that a light shielding structure 43 for preventing signal mixing between monitoring signals is provided between the light receiving parts 41 for each modulation part. As the light shielding structure 43, for example, an embedded type electrode or a groove structure can be used.

The present invention has been described above on the basis of the examples. However, the present invention is not limited to the contents described above, and it goes without saying that design changes can be appropriately made within a scope which does not depart from the gist of the present invention.

As described above, according to the present invention, in an optical modulator having a light receiving element for each of a plurality of modulation parts, an optical modulator with a reduced chip width can be provided.

What is claimed is:

1. An optical modulator comprising:
   a substrate having an electro-optic effect;
   an optical waveguide formed on the substrate;
   first and second modulation parts which respectively modulate light waves propagating through the optical waveguide; and
   a light receiving element which detects the light waves propagating through the optical waveguide,
   wherein as the light receiving element, a first light receiving element for the first modulation part and a second light receiving element for the second modulation part are provided, and
   the first light receiving element and the second light receiving element are disposed to be shifted from each other in a light propagation direction.

2. The optical modulator according to claim 1, wherein the first modulation part and the second modulation part are disposed to be shifted from each other in the light propagation direction, and the first light receiving element and the second light receiving element are disposed to be shifted from each other in the same light propagation direction as a direction in which the first modulation part and the second modulation part are shifted from each other.

3. The optical modulator according to claim 1, wherein each of the first light receiving element and the second light receiving element has two or more light receiving parts.

4. The optical modulator according to claim 3, wherein with respect to each of the first modulation part and the second modulation part, an output waveguide which guides the light waves modulated in the modulation part, and radiated light waveguides which guide radiated light from the modulation part to both sides of the output waveguide are provided,
   the respective radiated light waveguides on both sides of the output waveguide are bent so as to be parallel to each other, and
   the first light receiving element and the second light receiving element are respectively disposed at sections in which the radiated light waveguides on both sides of the output waveguide are parallelized, and are disposed to be shifted from each other in the light propagation direction.

* * * * *